United States Patent
Detwiler et al.

(10) Patent No.: US 10,715,890 B2
(45) Date of Patent: Jul. 14, 2020

(54) FEC BASED PON OPTIMIZATION

(71) Applicant: ADTRAN, Inc., Huntsville, AL (US)

(72) Inventors: Thomas Detwiler, Huntsville, AL (US); Richard Lee Goodson, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 16/199,533

(22) Filed: Nov. 26, 2018

(65) Prior Publication Data
US 2019/0174212 A1 Jun. 6, 2019

Related U.S. Application Data

(60) Provisional application No. 62/594,812, filed on Dec. 5, 2017.

(51) Int. Cl.
*H04Q 11/00* (2006.01)
*H04L 1/00* (2006.01)

(52) U.S. Cl.
CPC ....... *H04Q 11/0067* (2013.01); *H04L 1/0009* (2013.01); *H04L 1/0023* (2013.01); *H04L 1/0075* (2013.01); *H04Q 11/0066* (2013.01); *H04Q 2011/0081* (2013.01); *H04Q 2011/0083* (2013.01); *H04Q 2011/0086* (2013.01); *H04Q 2011/0088* (2013.01)

(58) Field of Classification Search
CPC .......... H04Q 11/0067; H04Q 11/0066; H04Q 2011/0081; H04Q 2011/0083; H04Q 2011/0088; H04Q 2011/0086; H04L 1/0075; H04L 1/0023; H04L 1/0009
See application file for complete search history.

(56) References Cited

U.S. PATENT DOCUMENTS

| 8,433,969 | B1 | 4/2013 | Wu |
| 2008/0260378 | A1 | 10/2008 | Khermosh |

(Continued)

FOREIGN PATENT DOCUMENTS

WO   WO 2014/100508   6/2014

OTHER PUBLICATIONS

Notification of Transmittal of the International Search Report and the Written Opinion of the International Searching Authority for PCT/US2018/062523 dated Mar. 22, 2019, 20 pages.

*Primary Examiner* — Leslie C Pascal
(74) *Attorney, Agent, or Firm* — Fish & Richardson P.C.

(57) ABSTRACT

Methods, systems, and apparatus, including computer programs encoded on a computer storage medium, for optimizing PON efficiency using a variable FEC. In one aspect, an OLT broadcasts a message over an optical network, and receives, from an ONU, a response to the message. The OLT transmits activation parameters specifying that the OLT supports multiple different FEC code lengths when FEC is activated, and receives from the ONU, a set of FEC code lengths supported by the ONU. The OLT also receives performance measures collected by the ONU. The OLT selects, from among the FEC code lengths supported by the ONU, one or more appropriate FEC code lengths for communications between the ONU and the OLT based on the performance measures collected by the ONU and performance measures collected by the OLT. The OLT configures the ONU to utilize the appropriate FEC code length.

17 Claims, 5 Drawing Sheets

(56) References Cited

U.S. PATENT DOCUMENTS

2010/0316380 A1    12/2010  De Lind Van Wijngaarden
2013/0156420 A1*   6/2013   Amitai ............. H04B 10/07953
                                                            398/27
2018/0083964 A1*   3/2018   Guo ........................ H04L 41/00

* cited by examiner

FEC BASED PON OPTIMIZATION

CROSS-REFERENCE TO RELATED APPLICATIONS

This application claims the benefit under 35 U.S.C. § 119(e) of U.S. Patent Application No. 62/594,812, entitled "FEC based PON Optimization," filed Dec. 5, 2017, which is incorporated herein by reference in its entirety.

BACKGROUND

This specification relates to optimizing a passive optical network (PON). As user data consumption/utilization increases, network operators are looking for ways to maximize the amount of data that they can send over their networks. Meanwhile, the use of Forward Error Correction (FEC) reduces the amount of payload data that can be delivered over a PON.

SUMMARY

In general, one innovative aspect of the subject matter described in this specification can be embodied in methods that include the actions of broadcasting, by an OLT, a message over an optical network; receiving, by the OLT and from an ONU, a response to the message; transmitting, by the OLT and to the ONU, activation parameters specifying that the OLT supports multiple different FEC code lengths when FEC is activated; receiving, by the OLT and from the ONU, a set of FEC code lengths supported by the ONU and performance measures collected by the ONU; selecting, by the OLT and from among the FEC code lengths supported by the ONU, one or more appropriate FEC code lengths for communications between the ONU and the OLT based on the performance measures collected by the ONU and performance measures collected by the OLT; and configuring, by the OLT, the ONU to utilize the appropriate FEC code length. Other embodiments of this aspect include corresponding systems, apparatus, and computer programs, configured to perform the actions of the methods, encoded on computer storage devices.

These and other embodiments can each optionally include one or more of the following features. Selecting the appropriate FEC code length can include selecting the FEC code length that will provide a target output error rate for a given input error rate specified by the performance measures collected by the ONU. Receiving a set of FEC code lengths supported by the ONU can include receiving an indication that the ONU supports at least two FEC code lengths, including one or more of RS(248,240), RS(248,232), RS(248,224), RS(224,216), RS(232,216), or RS(240,216).

Broadcast messages transmitted by the OLT can use a longer FEC code length than unicast messages transmitted to at least one of the ONUs that are registered with the OLT. An FS Header of communications between the OLT and ONUs can have a longer FEC code length than other portions of the FS frame.

Methods can include the actions of monitoring, by the OLT, an error rate for communications received from the ONU; determining, by the OLT, that the error rate has reached a pre-specified threshold error rate; and reconfiguring, by the OLT, the ONU to communicate using a different FEC code length based on the determination that the error rate has reached the pre-specified threshold error rate.

Methods can include configuring the ONU to utilize the appropriate FEC code length comprises transmitting an OMCI command instructing the ONU to utilize the appropriate FEC code.

Methods can include transmitting, by the ONU, a shortened final codeword that includes fewer parity bytes than other upstream codewords transmitted by the ONU.

Another innovative aspect of the subject matter described in this document can be embodied in an Optical Line Terminal ("OLT") that includes a Passive Optical Network ("PON") communications interface; one or more data processing apparatus; and one or more memory devices. The one or more data processing apparatus execute instructions that cause the one or more data processing apparatus to perform operations including broadcasting a message over an optical network; receiving, from an Optical Network Unit ("ONU"), a response to the message; transmitting, to the ONU, activation parameters specifying that the OLT supports multiple different Forward Error Correction ("FEC") code lengths when FEC is activated; receiving, from the ONU, a set of FEC code lengths supported by the ONU and performance measures collected by the ONU; selecting, from among the FEC code lengths supported by the ONU, one or more appropriate FEC code lengths for communications between the ONU and the OLT based on the performance measures collected by the ONU and performance measures collected by the OLT; and configuring the ONU to utilize the appropriate FEC code length. Other embodiments of this aspect include corresponding systems, methods, and computer programs.

These and other embodiments can each optionally include one or more of the following features. Selecting the appropriate FEC code length can include selecting the FEC code length that will provide a target output error rate for a given input error rate specified by the performance measures collected by the ONU. Receiving a set of FEC code lengths supported by the ONU can include receiving an indication that the ONU supports at least two FEC code lengths, including one or more of RS(248,240), RS(248,232), RS(248,224), RS(224,216), RS(232,216), or RS(240,216).

Broadcast messages transmitted by the OLT can use a longer FEC code length than unicast messages transmitted to at least one of the ONUs that are registered with the OLT. An FS Header of communications between the OLT and ONUs can have a longer FEC code length than other portions of the FS frame.

The instructions can cause the one or more data processing apparatus to perform operations including monitoring, by the OLT, an error rate for communications received from the ONU; determining, by the OLT, that the error rate has reached a pre-specified threshold error rate; and reconfiguring, by the OLT, the ONU to communicate using a different FEC code length based on the determination that the error rate has reached the pre-specified threshold error rate.

The instructions can cause the one or more data processing apparatus to perform operations including configuring the ONU to utilize the appropriate FEC code length comprises transmitting an OMCI command instructing the ONU to utilize the appropriate FEC code.

The instructions can cause the one or more data processing apparatus to perform operations including transmitting, by the ONU, a shortened final codeword that includes fewer parity bytes than other upstream codewords transmitted by the ONU.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Operators are looking for ways to maximize PON efficiency, especially in the burst-mode upstream direction, so as to maximize available link capacity. One solution is to allow for the use of higher-rate FEC codes, which reduces FEC overhead at the expense of error tolerance. For links that operate with a high amount of optical link margin, this would provide a useful method to recover a meaningful amount of capacity. Current PON standards allow for two options of FEC—on or off—and the FEC code used for 10G PON standards is currently RS(248,216), resulting in 13% overhead. The present document discusses using multiple additional code sets, including RS(248,224), RS(248,232), and RS(248,240) that reduce FEC overhead to 9.7%, 6.5%, and 3.2%, respectively, thereby reducing the amount of link capacity that is required to perform error correction and enabling that amount of link capacity to be used to transmit payload data (e.g., user data). This document also discusses the ability to dynamically switch between FEC codes based on existing performance monitoring (PM) counters— namely corrected symbols, total codewords, and uncorrectable codewords—to optimize the efficiency of the PON by using the appropriate FEC code at the appropriate time.

Link budgets for 10G PON were designed to allow for a specified amount of loss/penalty, e.g., roughly 30 dB of loss/penalty, through power splits, fiber length, and fiber-induced dispersion effects. Additionally, 10G PON transceivers are generally specified with receiver sensitivity performance at a bit error rate (BER) of 1E-3, such that the use of FEC is generally anticipated for any deployed transceiver module. 10G PON standards that have been utilized thus far have mandated support of RS(248,216), which can correct BER of up to 1E-3 with acceptable decoded error rates. But the only existing option is to either turn FEC on or off. It is not practical to expect field-deployed PONs to operate without FEC, but often times the RS(248,216) provides an unnecessarily high amount of coding gain, thus wasting bandwidth on the PON.

To optimize the efficiency of the PON, optical line terminals (OLTs) and optical network units (ONUs) can be configured to operate the PON with a different FEC code than is currently used to better match the coding gain needed for the link. Generally speaking, the use of new FEC codes can be implemented to co-exist with prior PON network elements (OLT & ONU) that do not support multiple different code options, implemented in a manner such that changing the operational mode of FEC is hitless to any receiver, implemented so that the OLT is in control of choice of upstream FEC on a per-ONU basis, and implemented in a manner that chooses the lowest-overhead code for downstream that will result in acceptable performance at all ONUs. Furthermore, the choice of FEC code can be dictated by OLT in response to currently defined PM statistics, and operators can be allowed to manually override (provision) the selection of FEC code.

Figure 1:
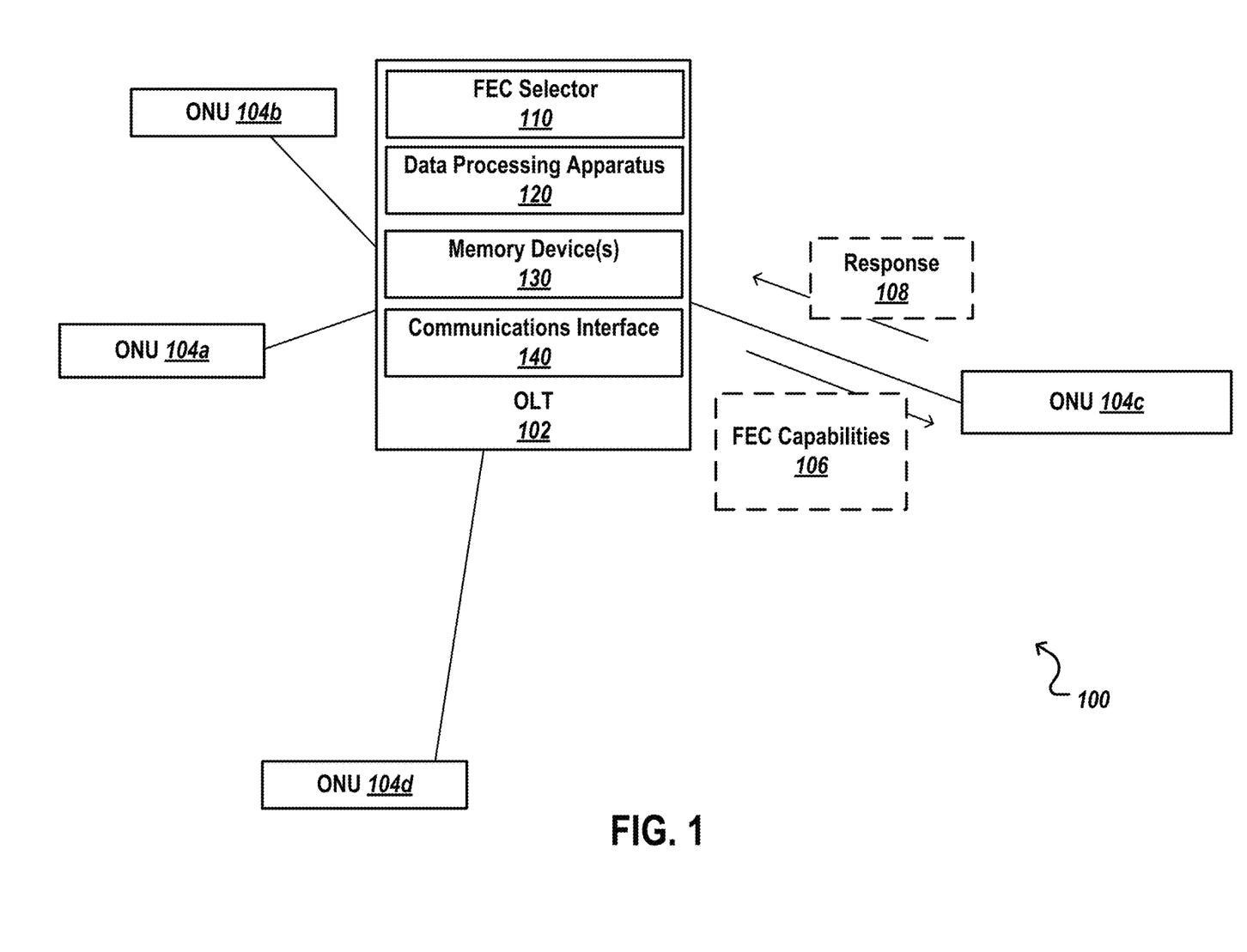
FIG. 1 is a block diagram of an example passive optical network.

FIG. 1 is a block diagram of an example passive optical network (PON) 100. The PON 100 includes an OLT 102. In some implementations, the OLT 102 includes one or more data processing apparatus 120, one or more memory devices 130, and one or more communications interfaces 140. For example, the OLT 102 can include a communications port that connects the OLT 102 to a PON and communicatively couples the OLT 102 to ONU 104a, ONU 104b, ONU 104c, and ONU 104d. The ONUs are collectively referred to as ONUs 104. The ONUs 104 can include a combination of legacy ONUs that do not support the dynamic selection and use of different FEC codes as well as modern ONU s that do support the dynamic selection and use of different FEC codes. As such, the OLT 102 can be configured to communicate with both legacy and modern ONUs. For example, the OLT can include an FEC selector 110, which can determine which FEC code to use based on the ONUs with which the OLT is communicating, as discussed in detail below. The following discussion refers to the OLT 102 performing various operations, which can be implemented using the FEC selector 110.

In some implementations, the OLT 102 will determine which FEC code to use for each ONU during activation of that ONU. For example, assume that the ONU 104c has not completed an activation cycle with the OLT 102, e.g., similar to that provided by Rec. ITU-T G.989.3. In this example, the OLT 102 and ONU 104c can exchange a series of messages (e.g., PLOAM) that will configure the ONU 104c to communicate with the OLT 102. The ONU management and control interface (OMCI) can be used to determine the receiver and/or transmitter capabilities. The FS header (framing sublayer header) and PLOAM (physical layer operations administration and management) overhead channel can be used to communicate the selected FEC code. In some implementations, the FEC code used can be statically set by provisioning. Alternatively, or additionally, the FEC code used can be dynamically selected and/or changed over time (e.g., based on changes in link BER)

The message exchanges by the OLT 102 and the ONU 104c during the activation process can include FEC configuration messages that allow the OLT 102 and ONU 104c to negotiate the FEC code that will be used for communications between the OLT 102 and the ONU 104c. In some implementations, the OLT 102 will transmit a FEC Capabilities Message 106 to the ONU 104c. The FEC Capabilities Message 106 includes a set of activation parameters specifying that the OLT 102 supports the use of multiple different FEC code lengths when FEC is activated. If the ONU 104c does not support the use of multiple different FEC code lengths, the ONU 104c will not respond to the FEC Capabilities message, and the OLT 102 can simply configure the ONU 104c to operate using the standard FEC code. As noted above, current standards for RS(248,216) allow for two modes of FEC, namely FEC on and FEC off. When FEC is on, the system corrects 1E-3 BER to an acceptable packet loss rate, while FEC is off, the system requires extremely low BER in order for operation of the system to be acceptable.

If the ONU 104c supports the use of multiple different FEC code lengths, the ONU 104c can generate a response 108 to the FEC Capabilities Message 106, and transmit the response to the OLT 102. The response 108 can specify a set of FEC code lengths that are supported by the ONU 104c. The response 108 can also specify a set of performance measures that are collected by the ONU 104c. The OLT 102 can then use the performance measures and the set of FEC code lengths that are supported by the ONU 104c to select an appropriate FEC code for the ONU 104c.

As discussed in more detail below, the operation of the system can be optimized (e.g., by utilizing less overhead to support FEC) by configuring the system to select from multiple different RS code options. The RS code that is selected for use can be determined based on the detected symbol error rate of the link, or provisioned by the operator of the link. The codeword (block size) utilized can remain at 248 bytes or the generator polynomial can remain the same. There can also be multiple different options for parity length. For example, the options for parity length can be 0, 8, 16, 24, 32, or some other byte size. In some implementations, the parity length can be selected as a multiple of 8-bytes, or a multiple of 4-bytes.

When the same codeword size is used (e.g., 248-bytes), different generator polynomials will be used to adjust the number of parity bytes. For example, RS(248,224), RS(248, 232), RS(248,240) each use a unique generator polynomial. When a single generator polynomial is used, different codeword sizes can be used, but if a constant codeword size is desired, the system could use a specified RS (e.g., RS248, 216), but mark 8/16/24 (or some other number) of parity bytes as erasures, such that the resulting codewords would be 240/232/224 bytes long, respectively, with each of the codewords containing 216 bytes of data. This reduces the implementation complexity, while allowing for variable length codewords.

Figure 2:
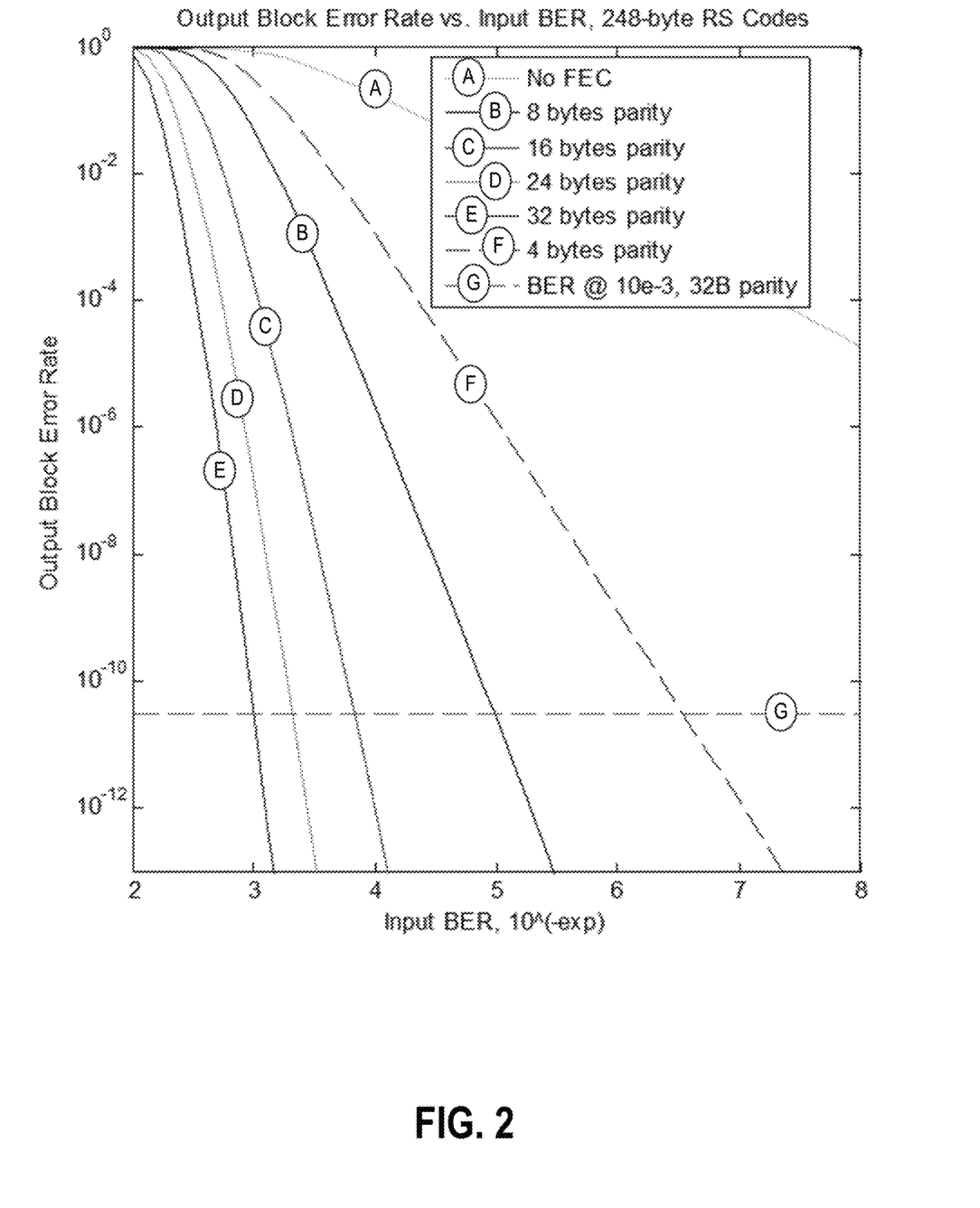
FIG. 2 is a graph showing various example input BER levels corresponding to fixed output codeword (block) error rates.

The system can select the FEC code to be used based on the operating BER of the link. For example, the system can measure (or detect) the BER on a particular link, and select an appropriate choice for the FEC code. In some implementations, the appropriate choice for the FEC code can be an FEC code that maximizes efficiency (or provides some specified level of efficiency), while also providing sufficient error correction ability (e.g., at least a minimum specified level of error correction). FIG. 2 is a graph 200 showing various example input BER levels corresponding to fixed output codeword (block) error rates (e.g., block error rate is RS(248,216) at 1E-3 input BER threshold). In some implementations, the OLT 102 can use information provided by the graph 200 to select an appropriate FEC code for the ONU 104c. For example, given the performance measures (e.g., BER) measured by the ONU 104c and the FEC code lengths supported by the ONU 104c, the OLT 102 can select the code length that will provide a target (e.g., desired) output block error rate.

Generally speaking, the amount of payload that can be carried over a link increases when fewer parity bytes are used for the FEC. Table 1 shows example amounts of payload increase corresponding to the use of various numbers of parity bytes

TABLE 1

| # Parity Bytes | Input BER | Code Rate | Payload Increase |
| --- | --- | --- | --- |
| 32 | 1.00E-3 | 0.871 | 0 Mb/s |
| 24 | 4.969E-4 | 0.903 | 321 Mb/s |
| 16 | 1.589E-4 | 0.935 | 642 Mb/s |
| 8 | 1.322E-5 | 0.968 | 963 Mb/s |
| 4 | 4.980E-7 | 0.984 | 1.12 Gb/s |
| 0 | 2.357E-13 | 1 | 1.28 Gb/s |

As shown in the table above, 4 parity bytes can be used with an input BER of 2.37E-7, which would result in an increased payload capacity of 1.12 Gb/s, while 24 parity bytes could be used with an input BER of 4.22E-4 to achieve a payload capacity increase of 321 Mb/s.

Figure 3:
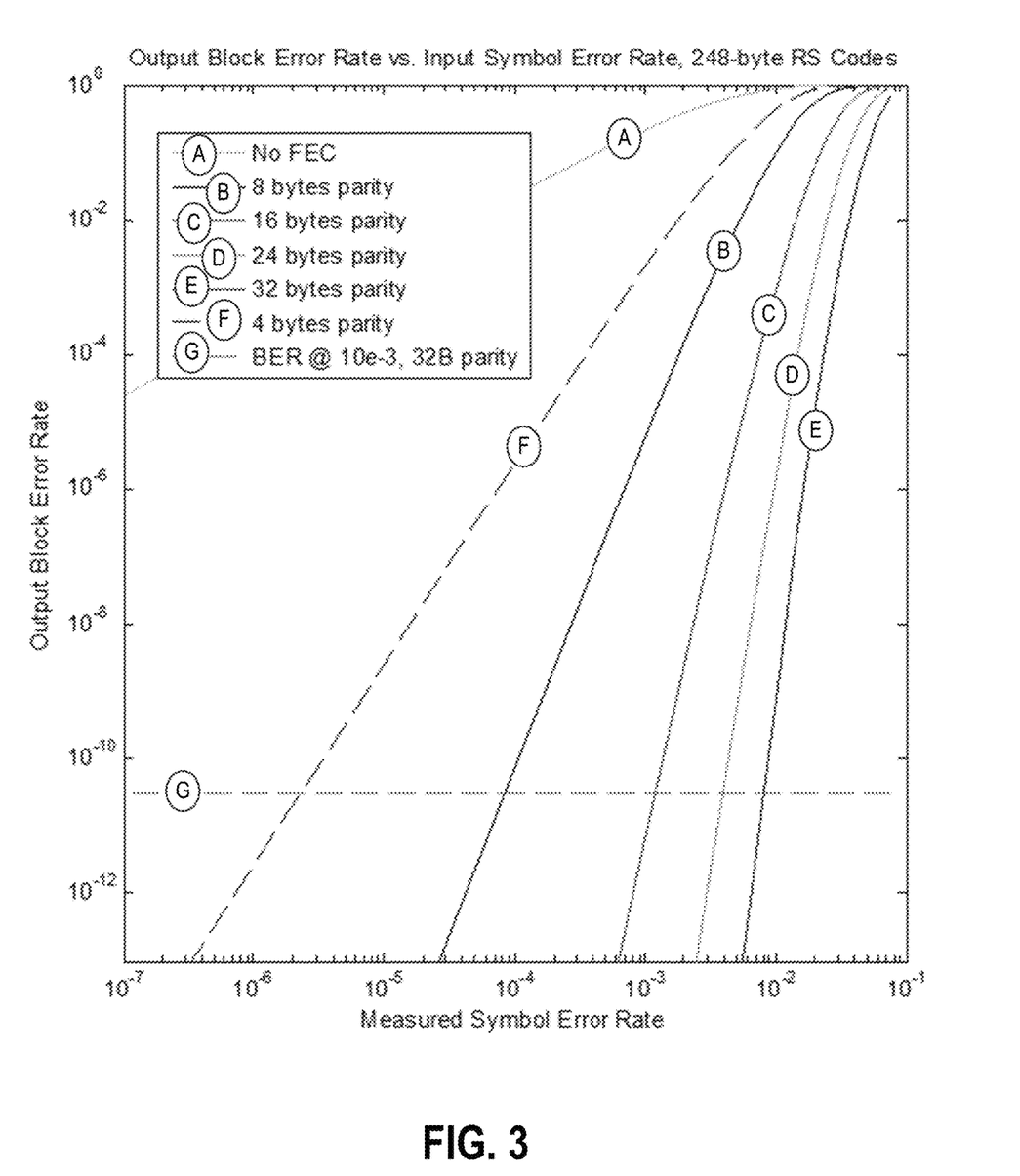
FIG. 3 shows an example graph of the output block error rate vs. input symbol error rates.

In some implementations, the OLT 102 tracks the FEC byte corrections (symbols) and total FEC block count to select the appropriate FEC. For example, the FEC byte correction and total FEC block count can be used by the OLT 102 to determine the symbol error rate that results in a threshold codeword (block) error rate. When FEC is off, the system can revert to bit interleaved parity (BIP) error counts. In some implementations, the detection interval can be the number of codewords that are required to achieve a near-100% confidence level with less than or equal to 120 symbol errors detected. FIG. 3 shows an example graph 300 of the output block error rate vs. input symbol error rate using 248-byte RS Codes.

The OLT 102 can select the number of parity bytes that will be used for FEC based at least in part on performance measures (e.g., receiver statistics). In some implementations, PM counters for corrected FEC bytes and total FEC codewords that are collected by the OLT 102 and/or ONUs 104 can be used to select the appropriate FEC code. For example, the system can use error count thresholds and decoding capabilities of the receiver to determine the highest rate (lowest parity byte) code that the receiver can use while still correcting all errors (or at least a specified amount of errors). Table 2 provides an example set of thresholds that can be used to select FEC codes.

TABLE 2

| Observed SER | Detection Interval | FEC Code |
| --- | --- | --- |
| <1E-14 BIP | 15 Days | No FEC |
| <4.000E-5 | >12k Blocks | RS(248, 240) |
| <5.330E-4 | >908 Blocks | RS(248, 232) |
| <1.684E-3 | >288 Blocks | RS(248, 224) |
| Else | | RS(248, 216) |

For downstream operation (e.g., communications from the OLT 102 to the ONUs 104), the selection and communication of the appropriate FEC code can be performed as follows. Each of the ONUs 104 can determine the highest acceptable rate code for that ONU, and communicate that highest acceptable rate code to the OLT 102 using the upstream FS header. For example, the highest acceptable rate code can be transmitted in the "Ind" field of the FS header, which currently has 7 reserved bits. The OLT 102 receives the highest acceptable rate code from each of the ONUs 104, and can select the lowest rate (highest parity) code that is reported by any of the ONUs 104. The FEC code corresponding to that lowest rate is then selected for use by the OLT 102. The OLT 102 can communicate the selected FEC code to the ONUs 104 using the Channel_Profile message. Currently, the FEC on/off status is communicated using this Channel_Profile message, but there are other reserved bits in octet 12, which can be used to communicate the selected FEC code to the ONUs 104. For any changes in downstream FEC code, a Channel_Profile message can be broadcast in PLOAMd in the frame preceding the change. Alternatively, pad bytes could be used to indicate the change and future superframe number. The PLOAMd field handles functions such as OAM-related alarms or threshold-crossing alerts. Other message formats for signaling a change in selected downstream FEC code are also possible.

For upstream operation (e.g., communications from the ONUs 104 to the OLT 102), the OLT 102 can establish a menu of FEC options with Burst_Profile PLOAM. In some implementations, the OLT 102 can unicast the Burst_Profile to each of the ONUs 104 so that different options can be setup for different ones of the ONUs 104. As discussed in more detail below, the ONUs 104 can each respond with information as to what FEC code lengths are supported by the ONUs 104, and the OLT 102 can select an appropriate FEC code length for each of the ONUs based on the responses (e.g., based on link characteristics, such as BER, etc). The OLT 102 can then communicate the selected FEC code length to each of the ONUs 104. For example, the OLT 102 can communicate the FEC code that the ONU 104c will use in a 2-bit BWmap Burst_Profile field (which can potentially vary from burst to burst) of a BWmap partition within the downstream FS frame. The selected upstream FEC code can also be communicated in other appropriate messages, as desired.

Figure 4:
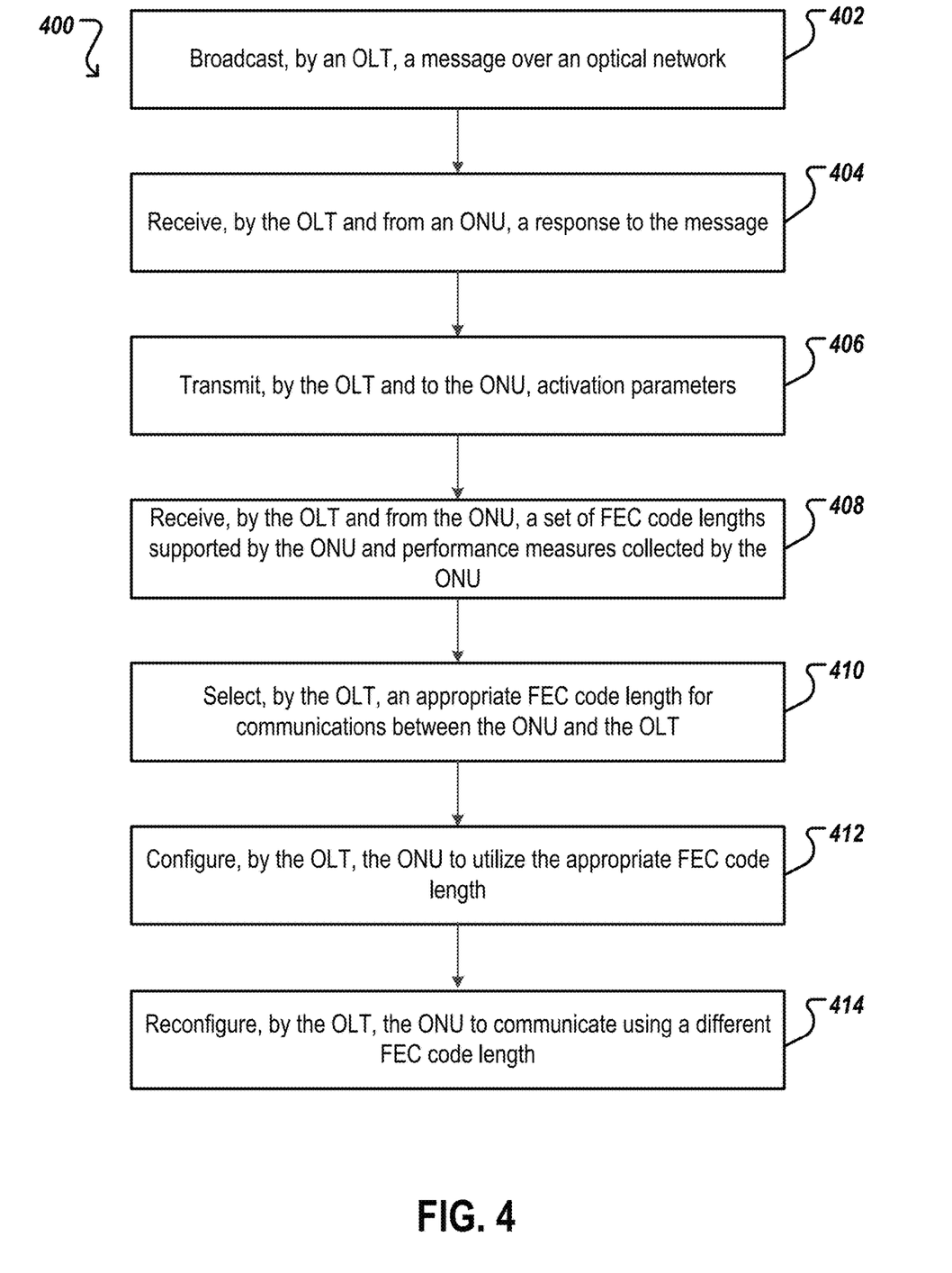
FIG. 4 is a flow chart of an example process for configuring an FEC code for communications between an ONU and an OLT.

FIG. 4 is a flow chart of an example process 400 for configuring the FEC code for communications between an ONU and an OLT. The process 400 can be implemented, for example, by an OLT, such as the OLT 102 of FIG. 1, or by another appropriate device that includes, for example, one or more data processors and hardware for communicating with/configuring ONUs. The process 400 can also be implemented as instructions stored on a non-transitory computer readable medium (e.g., a memory device), where the execution of the instructions cause a device (e.g., an OLT or another appropriate device that includes one or more processors) to perform operations of the process 400.

A message is broadcast over an optical network by an OLT (or another appropriate device) (402). In some implementations, the message broadcast by the OLT can be one or more of the messages required to enable an ONU to communicate with the OLT. For example, the message broadcast by the OLT can be a downstream PLOAM message, e.g., as specified by Rec. ITU-T G.989.3 or another appropriate standard either existing or forthcoming. In a specific example, one of the messages can be a serial number grant that is issued by the OLT, which specifies, for example, a quiet window during which the ONU can respond to the OLT. The message broadcast by the OLT could also be another appropriate message that facilitates activation of an ONU on the PON.

A response to the message is received by the OLT (404). The response is received from the ONU, and can include information used by the OLT to activate the ONU. For example, the response can be a "Serial_Number_ONU" PLOAM message, as specified by Rec. ITU-T G.989.3, or a similar message. The response can enable the OLT to assign the ONU a specific identifier for communicating directly with the ONU (e.g., in a unicast message).

Activation parameters are transmitted to the ONU by the OLT (406). The activation parameters specify that the OLT supports multiple different FEC code lengths when FEC is activated. For example, as discussed above, the OLT can be configured to support any number of different FEC code lengths, and the list of different FEC code lengths supported by the OLT can be transmitted to the ONU as activation parameters. In some implementations, the list of different FEC code lengths can be inserted into a Burst_Profile PLOAM of Rec. ITU-T G.989.3 or another appropriate message (e.g., management layer message) specified by Rec. ITU-T G.989.3 or another appropriate standard.

A set of FEC code lengths supported by the ONU and performance measures collected by the ONU are received by the OLT from the ONU (408). In some implementations, the set of FEC code lengths supported by the ONU can include an indication that the ONU supports at least two FEC code lengths, including one or more of RS(248,240), RS(248, 232), RS(248,224), or RS(248,216). Of course, the set of code lengths supported can specify other code lengths and even different FEC codes (e.g., RS 10 or 11 bit codes, BCH codes, LDPC codes).

The set of FEC code lengths transmitted by the ONU can be a full list of FEC code lengths that are supported by the ONU or a partial list of the FEC code lengths that are supported by the ONU. For example, the ONU can compare the list of FEC code lengths supported by the OLT to the FEC code lengths supported by the ONU. If the comparison reveals a mismatch, then the ONU could include, in the set of FEC code lengths, only those FEC code lengths that are supported by both the OLT and the ONU. However, the ONU could be configured to include, in the set of FEC code lengths transmitted to the OLT, all FEC code lengths supported by the ONU irrespective of whether the comparison reveals a mismatch. In some implementations, the set of FEC code lengths supported by the ONU is transmitted in an upstream "Serial_Number_ONU" message, or another appropriate upstream message (e.g., another management layer message).

In the event that the ONU is a legacy ONU that does not support multiple different FEC code lengths, the set of FEC code lengths may be a null set, and therefore not received by the OLT. In the situation where the OLT does not receive a set of FEC code lengths supported by the ONU, receives a null set, or otherwise does not obtain information regarding FEC code lengths supported by the ONU, the OLT can assume that only a default FEC code length (e.g., full parity) and FEC disabled mode are supported by the ONU. Furthermore, the information received by the OLT in step 408 may include the performance measures collected by the ONU, but not include the set of FEC code lengths supported by the ONU.

The OLT selects one or more appropriate FEC code lengths for communications between the ONU and the OLT (410). The appropriate FEC code length can be selected based on the set of FEC code lengths supported by the ONU (as specified in the message from the ONU), the performance measures collected by the ONU and reported to the OLT, and/or performance measures collected by the OLT. As discussed in more detail below, the FEC code length selected for downstream communications from the OLT to the ONU can differ from the FEC code length selected for upstream communications from the ONU to the OLT.

When the overlap in FEC code lengths supported by both of the ONU and the OLT is a single FEC code length, that FEC code length can be selected as the appropriate FEC code length for upstream communications from the ONU to the OLT and downstream communications from the OLT to the ONU. When more than one same FEC code length is supported by both the ONU and the OLT, the selection of the appropriate FEC code length can be based on factors such as the performance measures collected by the ONU, the performance measures collected by the OLT, a target performance measure, and/or other factors. For example, using information such as that provided in the graphs of FIG. 2 and/or FIG. 3, the OLT can select the FEC code length that will provide a target output error rate for a given input error rate, as specified by the performance measures collected by the ONU and/or performance measures collected by the OLT. In a specific example, assume that a target output block error rate of less than $10^{-10}$ is desired, and that the BER measured by the ONU is $10^{-4}$. In this example, the OLT can select an FEC code length having 16 bytes of parity or more to achieve the target block error rate of less than $10^{-10}$.

The selection of the FEC code length can also be based on other factors, such as a how much payload increase will be provided by the FEC code lengths that will achieve the target output error rate. Continuing with the example above and with reference to Table 1, the OLT can select the FEC code length with the lowest number of parity bits required to obtain the target output error rate when the goal is to maximize payload increase. In the example above, that would result in the OLT selecting the FEC code length having 16 bytes of parity. However, if the goal is to obtain more error correction than required, while also increasing the payload, a FEC code length with a higher number of parity bytes than required to obtain the target error rate can be selected. Continuing with the example above, using 24 bytes of parity will still provide a payload increase of 321 Mb/s, while also further improving the block error rate.

As noted above, the FEC code length selected for the upstream communications can differ from the FEC code length selected for downstream communications. For example, when the performance measures collected by the OLT indicate that the upstream communications from the ONU have a higher BER than the BER measured on downstream communications from the OLT to the ONU, the OLT may select a higher parity FEC code length for the upstream communications from the ONU in order to achieve the target error rate.

In some implementations, ONUs can be configured (e.g., by the OLT) to encode the first upstream codeword with a higher number of parity bytes (e.g., stronger FEC coding), and automatic gain control/burst clock data recovery (AGC/BCDR) can be enabled to reduce preamble length by allowing a few more symbol errors in the first codeword.

Furthermore, to ensure compatibility with legacy ONUs (e.g., ONUs that don't support multiple or all FEC codes) that are on a same PON with newer ONUs (e.g., that support multiple FEC codes), the OLT can be implemented to request that all new ONUs range with 32-byte parity. When a legacy ONU is discovered on the PON, the OLT can revert to RS(248,216) (or another FEC code supported by the legacy ONU) for downstream communications. A downstream PLOAM message for Channel_Profile can be added to support the techniques described above.

The FEC code length selected for use for upstream communications from the ONU to the OLT can also differ from the FEC code length used by the OLT for downstream communications based on the aggregate performance measures for downstream communications that are reported to the OLT by various ONUs that are communicating with the OLT. For example, the downstream BER reported by different ONUs can differ because of link-specific factors that affect the quality of transmissions between the OLT and each ONU. More specifically, a particular ONU that is further away from the OLT than other ONUs will generally have a higher BER than ONUs that are closer to the OLT due to length loss differences. Therefore, the particular ONU may require the use of a longer FEC parity length (i.e. lower code rate) than the other ONUs to achieve the target error rate. Although the OLT may be able to use a shorter FEC parity length (i.e. higher code rate) to communicate with some of the ONUs, the OLT may select the FEC code length required to achieve the target error rate for the particular ONU as the single FEC code length for downstream communications to ensure that all downstream communications have sufficient FEC to achieve the target error rate for all of the ONUs. In some implementations, the OLT can utilize the longer FEC code length for downstream broadcast messages, while using different FEC code lengths (e.g., shorter FEC code lengths) for unicast or multicast messages to individual or groups of ONUs. For example, the OLT may select longer (e.g., 32 bytes of parity) FEC code lengths for downstream broadcast messages, while selecting shorter ONU specific code lengths for unicast messages to each of at least some of the ONUs based on the BER reported by each of the ONUs (e.g., an FEC code length that provides the target error rate based on the performance measures reported by that ONU). In other words, broadcast messages transmitted by the OLT can use a longer FEC code length than unicast messages transmitted to at least one of the ONUs that are registered with the OLT. Using these types of techniques for selecting the FEC code length for downstream communications can result in some ONUs utilizing a different FEC code length for upstream communications than that used by the OLT for downstream communications.

In some implementations, the OLT can select a different FEC code length for different parts of the downstream FS frame. For example, the OLT can determine that the FEC code of the FS header should be different from the FEC code used for the rest of the FS downstream frame. For example, the OLT can use a stronger FEC code for the FS header than the FEC code that is used for the remainder of the downstream FS frame. In a specific example, 32 parity byte FEC coding can be used for the FS header, while a weaker (e.g., 8 parity bytes) FEC coding can be used for the FS payload and/or FS trailer. Using a stronger FEC code on the FS header ensures that all ONUs will be able to decode the FS header irrespective of the signal loss over the link to the ONU (e.g., related to distance from the OLT or other losses). In the event that a link to an ONU has high loss, the FEC code for the entire downstream FS frame can be changed to the higher FEC code used for the FS header (or another FEC code), as described above. However, for ONUs on links having lower loss, the FEC code for the FS payload and/or FS trailer, can utilize fewer parity bytes than the FS header.

Figure 5:
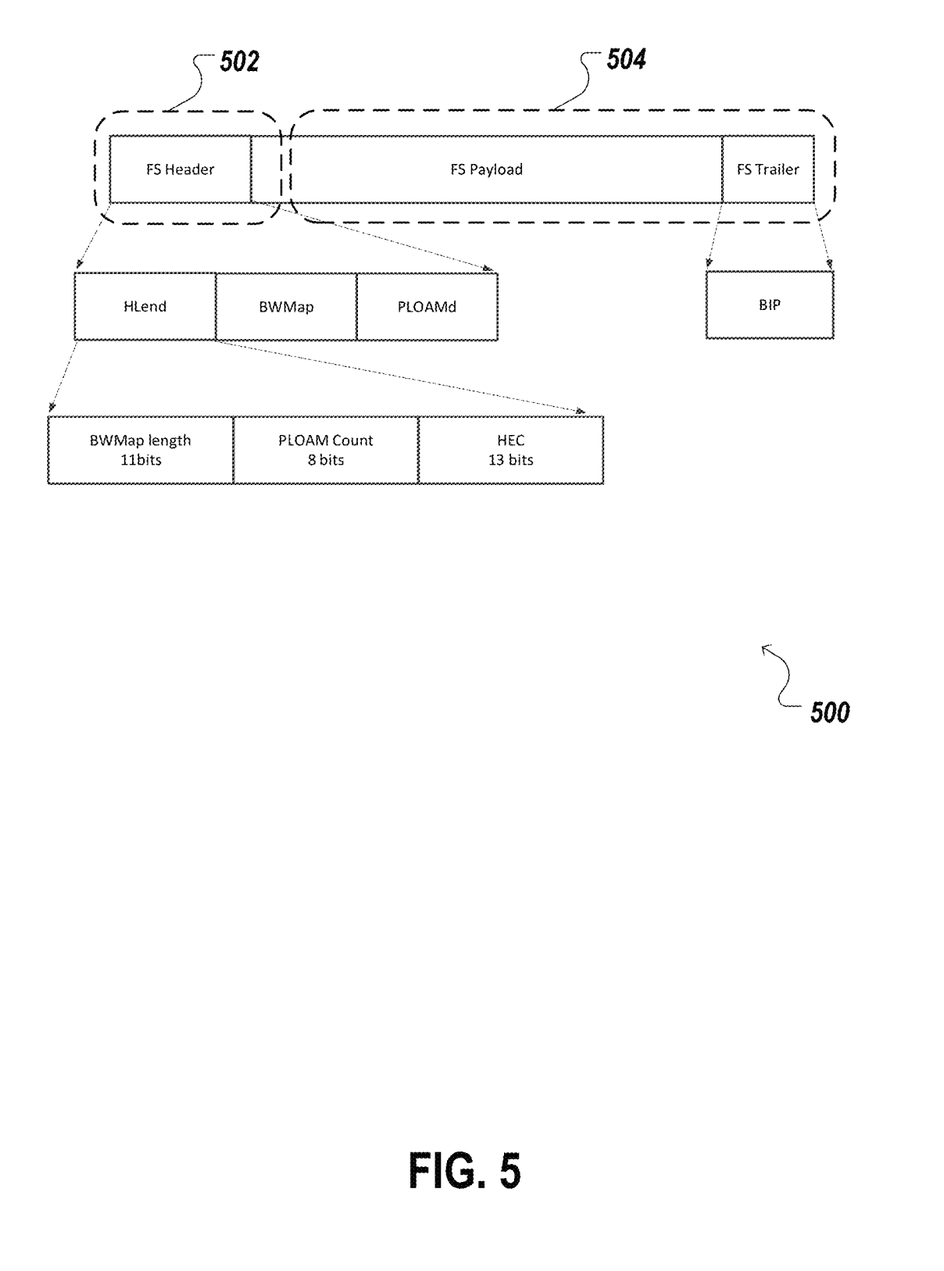
FIG. 5 shows an example FS frame in which the FEC code of the FS header differs from the FEC code used for other portions of the downstream FS frame.

FIG. 5 shows an example FS frame 500 in which the FEC code of the FS header 502 differs from the FEC code used for other portions of the downstream FS frame. Note that the final codeword using the stronger FEC code can include FS payload data. In this example, the FS header 502 is encoded using RS(248,216), i.e., 32 bytes of parity, while the remainder of the FS frame 504 is encoded with RS(248,240), i.e., 4 bytes of parity.

The final codeword of an upstream transmission may be shortened to a fraction of the normal codeword size so that the final upstream data will complete prior to the time at which the ONU is instructed to turn off its transmitting laser. In these cases, sending the full number of parity bytes for a shortened codeword may lead to excessive overhead. In some implementations, a capable ONU may be configured to transmit fewer parity bytes in the shortened final codeword, roughly proportional to its length.

With reference again to FIG. 4, the OLT configures the ONU to utilize the appropriate FEC code length (412). In some implementations, the configuration of the ONU by the OLT can be performed by way of the OLT transmitting an OMCI command over and OMCI channel instructing the ONU to utilize the appropriate FEC code for upstream communications. In some implementations, downstream PLOAM messages or other appropriate management layer messages can be utilized by the OLT to configure the ONU.

The OLT can optionally reconfigure the ONU to communicate using a different FEC code length over time (414). In some implementations, the OLT monitors an error rate for communications received from the ONU to determine whether to reconfigure the ONU to communicate using a different FEC code length. For example, when the OLT determines that the error rate of upstream communications received from the ONU have reached a pre-specified threshold error rate, the OLT can select a new FEC code length for the ONU in a manner similar to that discussed above, and reconfigure the ONU to use the new (different) FEC code length. As such, the OLT can dynamically modify the FEC code lengths used by various different ONUs based on changing conditions over time. For example, as BER of communications between a given ONU and the OLT change over time, the OLT can respond by changing the FEC code length used by that given ONU. This enables additional payload to be freed up when conditions (e.g., BER) allow for a shorter FEC code rate to be used, while ensuring that the target error rate is achieved over time.

Note that the description above refers to various FEC options, but that there are many other FEC options, and the techniques discussed above can be used (or modified) to allow for the use of other FEC options. For example, one possibility is to use erasures with Reed-Solomon FEC codes rather than keeping the FEC codeword fixed at 248 bytes.

Additionally, similar techniques can be implemented in IEEE Ethernet PON (EPON) standards. In these implementations, the choice of a variety of FEC codes may be applied with analogous behavior. The Ethernet operations, administration, and maintenance (OAM) overhead channel would be used instead of OMCI to indicate the capabilities of each ONU and OLT to participate in a variable-rate FEC mode, and to indicate the acceptable rate based on FEC decoder statistics. Upstream selection of FEC code (as dictated by the OLT) can be controlled through a GATE message in the multipoint MAC control protocol (MPCP) on a burst-by-burst basis, or otherwise provisioned by the system during service establishment through OAM. In EPON, a GATE message is a 64-byte Ethernet packet that has the MPCP protocol, and has a messages type of "GATE." These GATE messages handle upstream bandwidth grants, for example, by controlling which Logical Line Identifier "LLID" (one of several different traffic services hosted by an ONU) is supposed to transmit, at what start time, and at what stop time.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An Optical Line Terminal ("OLT") comprising:
 a Passive Optical Network ("PON") communications interface;
 one or more data processing apparatus; and
 one or more memory devices, wherein the one or more data processing apparatus execute instructions that cause the one or more data processing apparatus to perform operations comprising:
  broadcasting a message over an optical network;
  receiving, from an Optical Network Unit ("ONU"), a response to the message;
  transmitting, to the ONU, activation parameters specifying that the OLT supports multiple different Forward Error Correction ("FEC") code lengths when FEC is activated;
  receiving, from the ONU, a set of FEC code lengths supported by the ONU and performance measures collected by the ONU;
  selecting, from among the FEC code lengths supported by the ONU, one or more appropriate FEC code lengths for communications between the ONU and the OLT based on the performance measures collected by the ONU and performance measures collected by the OLT; and
  configuring the ONU to utilize the appropriate FEC code length, wherein broadcast messages transmitted by the OLT use a longer FEC code length than unicast messages transmitted to at least one of the ONUs that are registered with the OLT.

2. The OLT of claim 1, wherein selecting the appropriate FEC code length comprises selecting the FEC code length that will provide a target output error rate for a given input error rate specified by the performance measures collected by the ONU.

3. The OLT of claim 1, wherein receiving a set of FEC code lengths supported by the ONU comprises receiving an indication that the ONU supports at least two FEC code lengths, including one or more of RS(248,240), RS(248,232), RS(248,224), RS(224,216), RS(232,216), or RS(240,216).

4. The OLT of claim 1, wherein the instructions cause the OLT to perform operations comprising transmitting, by the ONU, a shortened final codeword that includes fewer parity bytes than other upstream codewords transmitted by the ONU.

5. The OLT of claim 1, wherein an FS Header of communications between the OLT and ONUS has a longer FEC code length than other portions of a FS frame.

6. The OLT of claim 1, wherein the instructions cause the one or more data processing apparatus to perform operations comprising:
 monitoring an error rate for communications received from the ONU;
 determining that the error rate has reached a pre-specified threshold error rate; and
 reconfiguring the ONU to communicate using a different FEC code length based on the determination that the error rate has reached the pre-specified threshold error rate.

7. The OLT of claim 1, wherein configuring the ONU to utilize the appropriate FEC code length comprises transmitting an OMCI command instructing the ONU to utilize the appropriate FEC code.

8. A method, comprising:
 broadcasting, by an OLT, a message over an optical network;
 receiving, by the OLT and from an ONU, a response to the message;
 transmitting, by the OLT and to the ONU, activation parameters specifying that the OLT supports multiple different FEC code lengths when FEC is activated;
 receiving, by the OLT and from the ONU, a set of FEC code lengths supported by the ONU and performance measures collected by the ONU;
 selecting, by the OLT and from among the FEC code lengths supported by the ONU, one or more appropriate FEC code lengths for communications between the ONU and the OLT based on the performance measures collected by the ONU and performance measures collected by the OLT; and configuring, by the OLT, the ONU to utilize the appropriate FEC code length, wherein broadcast messages transmitted by the OLT use a longer FEC code length than unicast messages transmitted to at least one of the ONUs that are registered with the OLT.

9. The method of claim 8, wherein selecting the appropriate FEC code length comprises selecting the FEC code length that will provide a target output error rate for a given input error rate specified by the performance measures collected by the ONU.

10. The method of claim 8, wherein receiving a set of FEC code lengths supported by the ONU comprises receiving an indication that the ONU supports at least two FEC code lengths, including one or more of RS(248,240), RS(248,232), RS(248,224), RS(224,216), RS(232,216), or RS(240,216).

11. The method of claim 8, wherein an FS Header of communications between the OLT and ONUS has a longer FEC code length than other portions of the FS frame.

12. The method of claim 8, further comprising:
monitoring, by the OLT, an error rate for communications received from the ONU;
determining, by the OLT, that the error rate has reached a pre-specified threshold error rate; and
reconfiguring, by the OLT, the ONU to communicate using a different FEC code length based on the determination that the error rate has reached the pre-specified threshold error rate.

13. The method of claim 8, wherein configuring the ONU to utilize the appropriate FEC code length comprises transmitting an OMCI command instructing the ONU to utilize the appropriate FEC code.

14. The method of claim 8, comprising transmitting, by the ONU, a shortened final codeword that includes fewer parity bytes than other upstream codewords transmitted by the ONU.

15. A non-transitory computer storage medium storing instructions that when executed by one or more data processing apparatus cause the one or more data processing apparatus to perform operations comprising:
broadcasting a message over an optical network;
receiving, from an Optical Network Unit ("ONU"), a response to the message;
transmitting, to the ONU, activation parameters specifying that the OLT supports multiple different Forward Error Correction ("FEC") code lengths when FEC is activated;
receiving, from the ONU, a set of FEC code lengths supported by the ONU and performance measures collected by the ONU;
selecting, from among the FEC code lengths supported by the ONU, one or more appropriate FEC code lengths for communications between the ONU and the OLT based on the performance measures collected by the ONU and performance measures collected by the OLT; and
configuring the ONU to utilize the appropriate FEC code length, wherein broadcast messages transmitted by the OLT use a longer FEC code length than unicast messages transmitted to at least one of the ONUs that are registered with the OLT.

16. The computer storage medium of claim 15, wherein selecting the appropriate FEC code length comprises selecting the FEC code length that will provide a target output error rate for a given input error rate specified by the performance measures collected by the ONU.

17. The computer storage medium of claim 15, wherein receiving a set of FEC code lengths supported by the ONU comprises receiving an indication that the ONU supports at least two FEC code lengths, including one or more of RS(248,240), RS(248,232), RS(248,224), RS(224,216), RS(232,216), or RS(240,216).

* * * * *

UNITED STATES PATENT AND TRADEMARK OFFICE
CERTIFICATE OF CORRECTION

PATENT NO. : 10,715,890 B2  
APPLICATION NO. : 16/199533  
DATED : July 14, 2020  
INVENTOR(S) : Thomas Detwiler and Richard Lee Goodson Page 1 of 1

It is certified that error appears in the above-identified patent and that said Letters Patent is hereby corrected as shown below:

In the Claims

In Column 14, Line 37, in Claim 5, delete "ONUS" and insert -- ONUs --, therefor.

In Column 15, Line 20, in Claim 11, delete "ONUS" and insert -- ONUs --, therefor.

Signed and Sealed this
Eighth Day of September, 2020

Andrei Iancu
*Director of the United States Patent and Trademark Office*